(12) United States Patent
Schultheis et al.

(10) Patent No.: US 7,018,760 B2
(45) Date of Patent: Mar. 28, 2006

(54) CERAMIC TONER FOR ELECTRO-PHOTOGRAPHIC PRINTING

(75) Inventors: Bernd Schultheis, Schwabenheim (DE); Cora Krause, Burrweiler (DE); Inka Henze, Udenheim (DE); Harry Engelmann, Ingelheim (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/498,891

(22) PCT Filed: Dec. 14, 2002

(86) PCT No.: PCT/EP02/14262

§ 371 (c)(1),
(2), (4) Date: Jun. 16, 2004

(87) PCT Pub. No.: WO03/058351

PCT Pub. Date: Jul. 17, 2003

(65) Prior Publication Data

US 2005/0106486 A1     May 19, 2005

(30) Foreign Application Priority Data

Jan. 8, 2002 (DE) ................. 102 00 412
Jan. 8, 2002 (DE) ............. 202 00 229 U

(51) Int. Cl.
*G03G 9/09* (2006.01)
(52) U.S. Cl. ................. 430/108.1; 430/108.6; 430/110.1; 430/124
(58) Field of Classification Search ............ 430/108.1, 430/109.3, 109.1, 108.6, 110.1, 124
See application file for complete search history.

(56) References Cited

U.S. PATENT DOCUMENTS

| | | | | |
|---|---|---|---|---|
| 5,750,299 A | * | 5/1998 | Ohshima et al. | ............... 430/47 |
| 5,976,736 A | | 11/1999 | Kawase et al. | |
| 6,110,632 A | * | 8/2000 | Dunford et al. | ......... 430/108.6 |
| 6,165,655 A | | 12/2000 | Kawase et al. | |

FOREIGN PATENT DOCUMENTS

| | | |
|---|---|---|
| DE | 44 13 168 A1 | 4/1995 |
| DE | 197 53 803 A1 | 6/1998 |
| EP | 0 751 434 A2 | 1/1997 |
| EP | 0 851 306 A1 | 7/1998 |
| EP | 0 647 885 B1 | 7/1999 |
| JP | 01058582 | 3/1989 |
| JP | 013713 | 1/2001 |
| WO | 98/01793 | 1/1998 |
| WO | 98/39272 | 9/1998 |

\* cited by examiner

*Primary Examiner*—John L. Goodrow
(74) *Attorney, Agent, or Firm*—Pauley Petersen & Erickson

(57) ABSTRACT

A ceramic toner which is transferable to a high-temperature resistant glass, glass ceramic or ceramic substrate by electrophotographic printing and which can be fired in a subsequent temperature process, containing color pigment particles in addition to special glass flow particles. According to this invention, the ceramic toner has a thermoplastic synthetic matrix which melts in a homogeneous manner on the substrate within a temperature range of 100° C.–400° C. and which, within the temperature range of 300° C.–500° C., vaporizes in an almost residue-free manner and/or decomposes in order to obtain a toner which can be transferred especially in a direct printing mode and which has almost no synthetic matrix residue after firing.

25 Claims, No Drawings

CERAMIC TONER FOR ELECTRO-PHOTOGRAPHIC PRINTING

BACKGROUND OF THE INVENTION

1. Field of the Invention

This invention relates to a ceramic toner, which can be transferred by electro-photographic printing to a glass, glass-ceramic or ceramic substrate of high temperature resistance and can be baked on during a subsequent temperature process, and which contains color pigment particles, besides glass flux particles.

2. Discussion of Related Art

As shown in German Patent Reference DE 44 13 168 A1, PCT International Application WO 98/39272 and European Patent Reference EP 0 647 885 B1, the ceramic color compounds are used for decorating ceramic and glass products, which are applied to a paper carrier as the transfer medium by the electro-photographic reproduction method. The paper carrier is coated with gum arabic, polyvinyl acetate or wax. The coloring substances copied onto the paper carrier are baked into the glass or ceramic surface after having been applied to the object to be imprinted. The paper carrier is burned in the process. This indirect printing process is cumbersome and the complete burning of the paper carrier without residue is not always assured. This residue often leads to waste. The ceramic colors mentioned in these publications have been developed especially for the decoration of ceramic articles. The colors cannot be employed in connection with special glass, glass-ceramic materials and glass of low thermal expansion.

SUMMARY OF THE INVENTION

It is one object of this invention to produce a toner of the type mentioned above but which can be used in connection with electro-photographic direct printing on glass, glass-ceramic and ceramic substrates, which is matched to the particular use requirements of these applications and whose substrate materials burn off, leaving almost no residue, and during which does not hinder a homogeneous flowing together of the glass flux and color pigment particles and assures a good homogeneous wetting of the substrates.

In accordance with this invention, this object is attained because the toner has: >30 to 80 weight-%, in particular 45 to 60 weight-%, of a special glass frit, 0 to <20 weight-%, in particular >5 to ≦20 weight-% of inorganic pigments, and 20 to 60 weight-%, in particular >30 to 50 weight-%, of a plastic matrix. This toner has a composition of a glass frit and inorganic pigments which is particularly matched for imprinting glass, glass-ceramic or ceramic materials. The adhesion problems during the imprinting of special glass, which are disadvantageous in connection with the prior art, are thus overcome. In particular, the toner can have a thermoplastic matrix, which melts homogeneously onto the substrate in the temperature range between 100° C. and 400° C., and in the temperature range starting at 300° C. to 500° C. evaporates and/or is burned off with almost no residue. The toner can also have auxiliary flow materials, with which it is possible to control the wetting of the substrates to be imprinted.

The attainment of the object represents a change from the development direction. According to this invention, the lowering of the pigment portion in favor of the glass frit leads to improved printing results.

By selecting the melting, the decomposition and/or the evaporation temperature of the plastic used, it is possible to match the plastic matrix as the carrier of the inorganic glass frits and pigments to the baking process so that prior to baking the plastic is melted homogeneously onto the substrate and then evaporates or is decomposed, and in the process does not hinder the melting together of the glass flux and color pigment particles. The toner image can be transferred directly to the substrate by an electro-photographic printing process, wherein removal of the carrier material without residue is assured in the baking process.

The weight-% information relates to the total weight of the toner, in particular with one-component toners. With so-called two-component toners, i.e. toners with magnetic carriers, the carrier is not taken into consideration in the weight composition information. Customarily 3 to 25 weight-% of toner are used with commercially available two-component toners. The remainder, 75 to 97 weight-%, constitutes the carrier.

If a two-component toner is used, for example, which contains 10 weight-% toner and 90 weight-% carrier, the weight-% portion of flux in the total two-component toner is found in accordance with this invention within the limits between 3 to 8 weight-% (10 weight-%•30 weight-%, or 80 weight-%•10 weight-%). Accordingly, the binder resin portion lies in the range between 3 and 5 weight-%.

It is also possible to transfer the toner indirectly. In this case a transfer means is used, for example a paper coated with gum arabic.

In further embodiments, the toner does not have any coloration pigments, so that the proportion of glass frit lies in the range between 50 and 70 weight-%, and the proportion of the plastic matrix in the range between 30 and 50 weight-%.

In accordance with one embodiment, the plastic matrix has toner resins on an acrylate basis, in particular styrene acrylate, polymethylmethacrylate. These materials are easy to work and show good adhesion to the substrate. Also, these materials burn without leaving a residue.

The melting, evaporation and/or decomposition temperature for affecting depolymerization can be achieved by selecting various polymers for the plastic matrix. Polyvinyl alcohol, polyoximethylene, styrene copolymers, polyvinylidene fluoride, polyvinylbutyral, polyester (unsaturated and/or saturated, or mixtures thereof), polycarbonate, polyvinyl pyrrolidone, vinyl imidazole copolymers, as well as polyether, can be suitable materials.

For improving the image transfer, or for the decomposition free of residue of the organic materials, it is possible in a known manner for the toner to additionally contain charge-control materials and/or oxidation agents. The added oxidation agents accelerate the thermal decomposition of the plastic matrix.

For improving wetting while melting the toner onto the surface which, as a rule is relatively polar and smooth, and in contrast to paper not absorbent, the toner is also coated with additives. With a suitable selection of known additives it is possible to control the polarity of the toners between non-polar, hydrophobic, neutral, polar, hydrophilic, and thus the wetting of the substrates. It is thus possible to use known auxiliary flow materials, such as aerosil and auxiliary transfer materials in order to improve the quality of the imprint. The proportion of such auxiliary materials is between 0 and 1.0 weight-%, typically between 0.2 and 0.5 weight-%.

Peroxides or azo compounds can be added to the toner for decomposition (depolymerization) which, however, have decomposition temperatures >150° C., so that decomposition does not already start during the melting period, or the fixation period. Moreover, inorganic additives are also possible, for example catalytically acting pigments, which accelerate the decomposition of the organic plastic matrix. Examples of this are so-called perovskites of the general formula $ABO_3$, $LaMnO_3$, $LaCoO_3$, $La_\alpha Sr_\beta Co_x Mn_\delta O_{3+\epsilon}$.

The table below shows exemplary embodiments of glass compositions, frits as well as fluxes, which are particularly suitable for a ceramic toner. The weight-% information relates to the respective composition of the glass frits.

The glass compositions 1 to 6 are particularly suitable for glass and glass-ceramics.

|  | Glass Composition 1 Gew.- % | Glass Composition 2 Gew.- % | Glass Composition 3 Gew.- % | Glass Composition 4 Gew.- % | Glass Composition 5 Gew.- % | Glass Composition 6 Gew.- % |
|---|---|---|---|---|---|---|
| $Li_2O$ | 0 ... 6.0 | 0 ... 5.0 | 2.0 ... 4.0 | 0 ... 2.0 | 0 ... 3.0 | 0.1 ... 1.5 |
| $Na_2O$ | 0 ... 5.0 | 0 ... 5.0 | 5.0 ... 9.5 | 0 ... 5.0 | 0 ... 2.5 | 7.0 ... 13.0 |
| $K_2O$ | 0 ... 2.0 | 0 ... 2.5 | 1.5 ... 4.0 | 0 ... 5.0 | 0 ... 8.0 | 0 ... 1.5 |
| MgO | 0 ... 4.0 | 0 ... 3.0 | 0 ... 0.5 | 0 ... 0.5 | 0 ... 8.5 |  |
| CaO | 0 ... 4.0 | 0 ... 4.0 | 0.0 ... 0.1 | 0 ... 1.0 | 0.5 ... 4.0 |  |
| SrO | 0 ... 4.0 | 0 ... 4.0 |  |  |  |  |
| BaO | 0 ... 1.0 | 0 ... 4. |  |  | 0 ... 28.0 | 2.0 ... 4.0 |
| ZnO | 0 ... 4.0 | 0 ... 4.0 |  | 0 ... 10.0 | 1.0 ... 15.0 |  |
| $B_2O_3$ | 13.0 ... 23.0 | 15.0 ... 27.0 | 13.0 ... 20.0 | 1.0 ... 10.0 | 4.0 ... 26.0 | 17.0 ... 22.0 |
| $Al_2O_3$ | 3.0 ... 10.0 | 7.0 ... 20.0 | 5.0 ... 10.0 | 0.5 ... 10.0 | 2.5 ... 18.0 | 4.0 ... 8.0 |
| $Bi_2O_3$ | 0 ... 2.5 | 0 ... 2.5 |  |  |  |  |
| $La_2O_3$ | 0 ... 3 | 0 ... 0.9 |  |  |  |  |
| $SiO_2$ | 50.0 ... 65.0 | 43.0 ... 58.0 | 41.0 ... 59.0 | 20.0 ... 45.0 | 40.0 ... 62.0 | 55.0 ... 65.0 |
| $TiO_2$ | 0 ... 4.0 | 0 ... 3.0 |  | 0 ... 0.5 |  | 0 ... 2.0 |
| $ZrO_2$ | 0 ... 4.0 | 0 ... 4.0 | 2.0 ... 5.5 | 0 ... 1.0 | 0 ... 2.5 |  |
| $SnO_2$ | 0 ... 2.0 | 0 ... 2.0 |  | 0 ... 3.0 |  |  |
| $P_2O_5$ | 0 ... 1.5 | 0 ... 2.5 |  |  |  |  |
| $Sb_2O_3$ | 0 ... 2.0 | 0 ... 2.5 |  |  |  |  |
| F | 0 ... 4.0 | 0 ... 3.0 | 0 ... 4.0 |  |  | 0 ... 3.5 |
| $CeO_2$ |  |  |  | 0 ... 10.0 |  |  |
| PbO |  |  |  | 20.0 ... 60.0 |  |  |
| CdO |  |  |  | 0 ... 1.5 |  |  |
| $T_g$ (° C.) | 400 ... 650 | 450 ... 650 |  |  |  |  |
| $E_w$ (° C.) | 580 ... 830 | 600 ... 850 |  |  |  |  |
| $V_A$ (° C.) | 840 ... 1100 | 880 ... 1150 |  |  |  |  |
| $\alpha_{20-700°\ C.}$ $(10^{-6}K)$ | < 2.0 |  |  |  |  |  |
| $\alpha_{20-700°\ C.}$ $(10^{-6}K)$ |  | 3.5–7.0 |  |  |  |  |
| $\alpha_{20-300°\ C.}$ $(10^{-6}K)$ | 3.5–8.0 |  |  |  |  |  |

Special exemplary embodiments for the glass composition 1 are:

GLASS COMPOSITION 1

|  | Exemplary Embodiment 1 Gew.- % | Exemplary Embodiment 2 Gew.- % | Exemplary Embodiment 3 Gew.- % | Exemplary Embodiment 4 Gew.- % | Exemplary Embodiment 5 Gew.- % | Exemplary Embodiment 6 Gew.- % | Exemplary Embodiment 6 Gew.- % |
|---|---|---|---|---|---|---|---|
| $Li_2O$ | 2.0 | 3.0 | 4.4 | 2.0 | 2.0 | 3.3 | 4.6 |
| $Na_2O$ | 4.0 | 2.0 |  | 4.0 | 4.0 | 4.0 | 4.1 |
| $K_2O$ | 1.0 | 1.0 |  |  | 1.3 |  |  |
| MgO | 2.0 |  | 1.2 | 1.0 |  | 1.0 | 0.9 |
| CaO |  |  | 2.0 |  | 3.0 | 0.7 | 1.3 |
| SrO | 3.0 |  | 2.0 | 1.0 |  | 1.4 | 1.8 |
| BaO |  | 1.0 | 1.0 |  |  |  |  |
| ZnO | 3.0 | 1.0 | 3.0 | 2.0 |  | 1.1 | 0.2 |
| $B_2O_3$ | 22.0 | 17.0 | 17.6 | 20.0 | 22.0 | 19.9 | 17.5 |
| $Al_2O_3$ | 6.0 | 8.8 | 9.0 | 6.4 | 9.8 | 6.0 | 6.0 |
| $Bi_2O_3$ |  |  | 2.0 |  | 1.4 |  |  |
| $La_2O_3$ |  | 1.0 |  |  | 2.6 |  |  |
| $SiO_2$ | 55.0 | 61.4 | 54.0 | 61.0 | 52.0 | 60.5 | 60.3 |
| $TiO_2$ |  | 2.0 |  |  |  |  |  |
| $ZrO_2$ | 2.0 |  | 1.0 |  |  | 1.0 | 2.1 |
| $SnO_2$ |  |  |  | 1.0 | 1.5 |  |  |
| $P_2O_5$ |  |  |  | 1.0 |  |  |  |
| $Sb_2O_3$ |  | 1.8 | 0.8 |  | 0.4 |  |  |
| F |  |  | 2.0 | 0.6 |  | 1.1 | 1.2 |
| $T_g$ (° C.) | 510 | 490 | 485 | 485 | 525 | 475 | 475 |
| $E_w$ (° C.) | 670 | 675 | 685 | 695 | 675 | 660 | 630 |

-continued

GLASS COMPOSITION 1

| | Exemplary Embodiment 1 Gew.-% | Exemplary Embodiment 2 Gew.-% | Exemplary Embodiment 3 Gew.-% | Exemplary Embodiment 4 Gew.-% | Exemplary Embodiment 5 Gew.-% | Exemplary Embodiment 6 Gew.-% | Exemplary Embodiment 6 Gew.-% |
|---|---|---|---|---|---|---|---|
| $V_A$ (°C.) | 925 | 985 | 885 | 987 | 930 | 900 | 873 |
| $\alpha_{20-300°C.}$ ($10^{-6}$K) | 5.5 | 5.0 | 5.3 | 5.0 | 5.8 | 5.5 | 6.2 |

Special exemplary embodiments for the glass composition 2 are:

GLASS COMPOSITION 2

| | Exemplary Embodiment 1 Gew.-% | Exemplary Embodiment 2 Gew.-% | Exemplary Embodiment 3 Gew.-% | Exemplary Embodiment 4 Gew.-% | Exemplary Embodiment 5 Gew.-% | Exemplary Embodiment 6 Gew.-% | Exemplary Embodiment 6 Gew.-% |
|---|---|---|---|---|---|---|---|
| $Li_2O$ | 4.0 | 2.0 | 3.1 | 2.8 | 3.0 | 3.0 | |
| $Na_2O$ | 3.0 | 4.0 | | 1.5 | 1.0 | | 1.6 |
| $K_2O$ | | | | | | | 7.2 |
| MgO | 1.0 | 1.0 | 1.7 | 0.4 | 1.5 | 1.5 | |
| CaO | 2.0 | 2.0 | 2.0 | | 2.0 | 1.5 | 3.6 |
| SrO | | | 2.3 | | | 2.0 | |
| BaO | | | | 3.7 | 1.0 | | |
| ZnO | 2.0 | | 2.2 | 1.0 | 2.0 | 2.0 | 1.5 |
| $B_2O_3$ | 19.0 | 19.0 | 16.7 | 17.3 | 17.5 | 17.0 | 24.4 |
| $Al_2O_3$ | 12.5 | 19.0 | 16.6 | 17.1 | 16.0 | 17.0 | 17.5 |
| $Bi_2O_3$ | | | | | | | |
| $La_2O_3$ | | | | | 0.5 | | |
| $SiO_2$ | 55.0 | 51.0 | 54.3 | 52.0 | 53.0 | 52.0 | 42.2 |
| $TiO_2$ | 1.0 | 2.0 | | 1.9 | | | |
| $ZrO_2$ | 0.5 | | 1.1 | 1.0 | 1.0 | 1.0 | 2.0 |
| $SnO_2$ | | | | | 1.5 | | |
| $P_2O_5$ | | | | | | 2.0 | |
| $Sb_2O_3$ | | | | 1.3 | | | |
| F | | | | | | 1.0 | |
| $T_g$ (°C.) | 509 | 533 | 578 | 529 | 539 | 523 | 541 |
| $E_w$ (°C.) | 655 | 741 | 755 | 765 | 724 | 730 | 762 |
| $V_A$ (°C.) | 914 | 1062 | 1064 | 1081 | 1024 | 1062 | 1069 |
| $\alpha_{20-300°C.}$ ($10^{-6}$K) | 5.65 | 5.18 | 4.41 | 4.86 | 4.68 | 4.3 | 5.89 |

The glass composition 7 is particularly suited for secondary baked glass-ceramics:

| | Glass Composition 7 Gew.-% |
|---|---|
| $Li_2O$ | 2.0 ... 5.0 |
| $Na_2O$ | 1.0 ... 2.5 |
| $K_2O$ | 1.0 ... 3.0 |
| MgO | 0 ... 1.5 |
| BaO | 0 ... 4.0 |
| ZnO | 0 ... 1.0 |
| $B_2O_3$ | 10.0 ... 20.0 |
| $Al_2O_3$ | 5.0 ... 10.0 |
| $SiO_2$ | 60.0 ... 70.0 |
| $TiO_2$ | 0 ... 2.0 |
| $ZrO_2$ | 0 ... 2.0 |

The glass compositions 8 to 10 are particularly suited for glass:

| | Glass Composition 8 Gew.-% | Glass Composition 9 Gew.-% | Glass Composition 10 Gew.-% |
|---|---|---|---|
| $Li_2O$ | 0 ... 7.0 | 2.0 ... 5.0 | |
| $Na_2O$ | 2.0 ... 8.0 | 5.0 ... 10.0 | 3.0 ... 10.0 |
| $K_2O$ | 0 ... 5.0 | | |
| MgO | | 0 ... 2.0 | 0 ... 2.0 |
| CaO | 0 ... 3.0 | 1.0 ... 7.0 | 2.0 ... 5.0 |
| SrO | 0 ... 3.0 | 0 ... 2.0 | |
| BaO | | | 0.5 ... 3.0 |
| ZnO | 2.0 ... 10.0 | 7.0 ... 13.0 | 6.0 ... 13.0 |
| $B_2O_3$ | 20.0 ... 32.0 | 14.0 ... 26.0 | 20.0 ... 40.0 |
| $Al_2O_3$ | 1.0 ... 15.0 | 4.0 ... 16.0 | |
| $Bi_2O_3$ | 0 ... 10.0 | | |
| $SiO_2$ | 24.0 ... 40.0 | 30.0 ... 50.0 | 45.0 ... 70.0 |
| $TiO_2$ | | 0 ... 4.0 | 0 ... 20 |
| $ZrO_2$ | | 0 ... 3.0 | |
| $Sb_2O_3$ | | | 0 ... 0.5 |

-continued

|  | Glass Composition 8 Gew.- % | Glass Composition 9 Gew.- % | Glass Composition 10 Gew.- % |
|---|---|---|---|
| F |  | 0 . . . 3.0 | 0 . . . 4.0 |
| PbO |  |  | 0 . . . 2.0 |

The glass compositions 11 to 12 are particularly suited for ceramics, stone ware, bone china and porcelain:

|  | Glass Composition 11 Gew.- % | Glass Composition 12 Gew.- % |
|---|---|---|
| $Li_2O$ | 2.5 . . . 4 | 0.9 . . . 7.4 |
| $Na_2O$ | 2.7 . . . 7.4 | 1.6 . . . 8.2 |
| $K_2O$ | 2.9 . . . 8.0 | 0.5 . . . 6.1 |
| MgO | 0 . . . 0.5 | 0 . . . 4.0 |
| CaO | 0 . . . 0.5 | 0.4 . . . 4.5 |
| SrO |  | 0 . . . 4.0 |
| BaO | 0 . . . 0.5 |  |
| ZnO | 0 . . . 1.5 | 0.4 . . . 3.8 |
| $B_2O_3$ | 14.5 . . . 18.5 | 11.0 . . . 36.4 |
| $Al_2O_3$ | 3.0 . . . 5.0 | 2.0 . . . 14.6 |
| $La_2O_3$ |  | 0 . . . 3.0 |
| $SiO_2$ | 53.0 . . . 70.0 | 28.0 . . . 69.0 |
| $TiO_2$ | 0 . . . 0.5 | 0 . . . 6.0 |
| $ZrO_2$ | 5.5 . . . 13.5 | 1.3 . . . 20.6 |
| $SnO_2$ |  |  |
| $P_2O_5$ | 0 . . . 0.5 | 0 . . . 10.0 |
| $Sb_2O_3$ |  |  |
| F |  | 0 . . . 8.0 |
| $SO_3$ | 0 . . . 0.5 |  |
| $Fe_2O_3$ | 0 . . . 0.5 |  |
| $Y_2O_3$ | 0 . . . 0.5 | 0 . . . 1.0 |
| $CeO_2$ | 0 . . . 0.5 |  |
| PbO |  | 0 . . . 1.5 |
| Further Rare Earth Metal Oxides |  | 0 . . . 1.0 |
| $T_g$ (° C.) |  | 470 . . . 610 |
| $\alpha_{20-300°\,C.}$ $(10^{-6}K)$ |  | 5.0 . . . 8.0 |

At least in the composition ranges 1 and 2, properties of these glass frits are shown, which are particularly matched to the special requirements in connection with direct imprinting of glass ceramics having a coefficient of expansion of less than $20 \times 60^{-6}\,K^{-1}$ (in the temperature range of 20 to 700° C.). Mixtures of the above mentioned glass frits are also conceivable, depending on the type of use.

Based on their properties, these glass frits, together with corresponding inorganic pigments are particularly suitable for electro-photographic imprinting of special glass plates, such as soda-lime glass or borosilicate glass, if necessary, each previously coated with $SiO_2$ and/or with $TiO_2$, for example, or with one of the above mentioned glass frits, for example for the applications in oven front panes, interior panes for ovens, bottom inserts for refrigerators, display case glass, etc., as well as for direct imprinting of glass ceramics of low expansion, for example for use in glass-ceramic cooking surfaces or grilling surfaces, or fireplace view panes. But ceramic surfaces, for example floor tiles or sanitary installations, can also be directly imprinted. Requirements regarding abrasion resistance, adhesion and chemical resistance are especially taken into consideration with the respective glass frit composition in accordance with the tables.

Inorganic compositions, such as metal oxides, mixed phases, metal oxide pigments or CIC pigments, complex inorganic color pigments, embedded pigments, metal powder or flakes, metal colloids, nacreous or luster pigments on the basis of mica, or vitreous, or $SiO_2$, or $Al_2O_3$ platelets, fluorescing pigments, magnetic pigments, anti-corrosive pigments, transparent pigments, sintered-in pigments and/or mixtures of pigments and glass frits, pigments for four-color batches, etc., or mixtures of the above variants are typically considered as color pigments, which have already been sufficiently described in the literature, for example "Ullmann's Encyclopedia of Industrial Chemistry, vol. A20, 1992, VCH Publishers, Inc. The pigments can be based on the most varied crystal structures, such as rutile, spinel, zircon, baddeleyite, cassiterite, corundum, garnet, sphene, pyrochlore, olivine, phenakite, periclase, sulfide, perovskite and the like.

The typical size of the glass flux particles and the inorganic pigments here lies in the range of 0.5 to 25 μm (D5O vol.), in particular in the range between 1 and 10 μm. Examples of comminuting processes for producing such particles are counter-flow comminution, comminution in ball, annular gap or pinned disk mills.

Based on the manufacturing process of the toner, the glass flux particles, as well as the pigments, are typically only partially, i.e. incompletely, encased by the plastic matrix, and as a rule have an irregular shape. The reason for this is in particular that the inorganic components, glass flux and pigments, have a different fracture toughness in comparison with the organic plastic matrix and preferably break open at the grain boundaries during the comminution process of the toner. Additives or auxiliary flow materials which are added at a later time settle on the surface of the plastic matrix or on that of the exposed flux and/or pigment particles.

What is claimed is:

1. A ceramic toner which can be transferred by an electro-photographic printing to a glass, a glass-ceramic or a ceramic substrate having a high temperature resistance and which can be baked on during a subsequent temperature process, and which contains color pigment particles, in addition to glass flux particles, wherein the ceramic toner has:
>30 to 80 weight-%, of a special glass frit,
and 0 to <20 weight-% of inorganic pigments, and 20 to 60 weight-% of a plastic matrix, the ceramic toner comprising:
a glass flux having a composition composed from a list of compositions 1–12, the compositions 1–12 being:

|  | Glass Composition 1 Gew.- % | Glass Composition 2 Gew.- % | Glass Composition 3 Gew.- % |
|---|---|---|---|
| $Li_2O$ | 0 . . . 6.0 | 0 . . . 5.0 | 2.0 . . . 4.0 |
| $Na_2O$ | 0 . . . 5.0 | 0 . . . 5.0 | 5.0 . . . 9.0 |
| $K_2O$ | 0 . . . 2.0 | 0 . . . 2.5 | 1.5 . . . 4.0 |
| MgO | 0 . . . 4.0 | 0 . . . 3.0 | 0 . . . 0.5 |
| CaO | 0 . . . 4.0 | 0 . . . 4.0 | 0.0 . . . 0.1 |
| SrO | 0 . . . 4.0 | 0 . . . 4.0 |  |
| BaO | 0 . . . 1.0 | 0 . . . 4.0 |  |
| ZnO | 0 . . . 4.0 | 0 . . . 4.0 |  |
| $B_2O_3$ | 13.0 . . . 23.0 | 15.0 . . . 27.0 | 13.0 . . . 20.0 |
| $Al_2O_3$ | 3.0 . . . 10.0 | 7.0 . . . 20.0 | 5.0 . . . 10.0 |
| $Bi_2O_3$ | 0 . . . 2.5 | 0 . . . 2.5 |  |

-continued

| | | | |
|---|---|---|---|
| La$_2$O$_3$ | 0 ... 3 | 0 ... 0.9 | |
| SiO$_2$ | 50.0 ... 65.0 | 43.0 ... 58.0 | 41.0 ... 59.0 |
| TiO$_2$ | 0 ... 4.0 | 0 ... 3.0 | |
| ZrO$_2$ | 0 ... 4.0 | 0 ... 4.0 | 2.0 ... 5.5 |
| SnO$_2$ | 0 ... 2.0 | 0 ... 2.0 | |
| P$_2$O$_5$ | 0 ... 1.5 | 0 ... 2.5 | |
| Sb$_2$O$_3$ | 0 ... 2.0 | 0 ... 2.5 | |
| F | 0 ... 4.0 | 0 ... 3.0 | 0 ... 4.0 |
| SO$_3$ | | | |
| Fe$_2$O$_3$ | | | |
| Y$_2$O$_3$ | | | |
| CeO$_2$ | | | |
| PbO | | | |
| Further Rare Earth Metal Oxides | | | |
| CdO | | | |
| T$_g$ (° C.) | 400 ... 650 | 450 ... 650 | |
| E$_w$ (° C.) | 580 ... 830 | 600 ... 850 | |
| V$_A$ (° C.) | 840 ... 1100 | 880 ... 1150 | |
| | | α$_{20–700° C.}$ (10$^{-6}$K) < 2.0 | α$_{20–700° C.}$ (10$^{-6}$K) 3.5–7.0 |
| | | α$_{20–300° C.}$ (10$^{-6}$K) 3.5–8.0 | |

| | Glass Composition 4 Gew.- % | Glass Composition 5 Gew.- % | Glass Composition 6 Gew.- % |
|---|---|---|---|
| Li$_2$O | 0 ... 2.0 | 0 ... 3.0 | 0.1 ... 1.5 |
| Na$_2$O | 0 ... 5.0 | 0 ... 2.5 | 7.0 ... 13.0 |
| K$_2$O | 0 ... 5.0 | 0 ... 8.0 | 0 ... 1.5 |
| MgO | 0 ... 0.5 | 0 ... 8.5 | |
| CaO | 0 ... 1.0 | 0.5 ... 4.0 | |
| SrO | | | |
| BaO | 0 ... 10.0 | 0 ... 28.0 | 2.0 ... 4.0 |
| ZnO | | 1.0 ... 15.0 | |
| B$_2$O$_3$ | 1.0 ... 10.0 | 4.0 ... 26.0 | 17.0 ... 22.0 |
| Al$_2$O$_3$ | 0.5 ... 10.0 | 2.5 ... 18.0 | 4.0 ... 8.0 |
| Bi$_2$O$_3$ | | | |
| La$_2$O$_3$ | | | |
| SiO$_2$ | 20.0 ... 45.0 | 40.0 ... 62.0 | 55.0 ... 65.0 |
| TiO$_2$ | 0 ... 0.5 | | 0 ... 2.0 |
| ZrO$_2$ | 0 ... 1.0 | 0 ... 2.5 | |
| SnO$_2$ | 0 ... 3.0 | | |
| P$_2$O$_5$ | | | |
| Sb$_2$O$_3$ | | | |
| F | | | 0 ... 3.5 |
| SO$_3$ | | | |
| Fe$_2$O$_3$ | | | |
| Y$_2$O$_3$ | | | |
| CeO$_2$ | 0 ... 10.0 | | |
| PbO | 20.0 ... 60.0 | | |
| Further Rare Earth Metal Oxides | | | |
| CdO | 0 ... 1.5 | | |
| T$_g$ (° C.) | | | |
| E$_w$ (° C.) | | | |
| V$_A$ (° C.) | | | |

| | Glass Composition 7 Gew.- % | Glass Composition 8 Gew.- % | Glass Composition 9 Gew.- % |
|---|---|---|---|
| Li$_2$O | 2.0 ... 5.0 | 0 ... 7.0 | 2.0 ... 5.0 |
| Na$_2$O | 1.0 ... 2.5 | 2.0 ... 8.0 | 5.0 ... 10.0 |
| K$_2$O | 1.0 ... 3.0 | 0 ... 5.0 | |
| MgO | 0 ... 1.5 | | 0 ... 2.0 |
| CaO | | 0 ... 3.0 | 1.0 ... 7.0 |
| SrO | | 0 ... 3.0 | 0 ... 2.0 |
| BaO | | 0 ... 4.0 | |
| ZnO | 0 ... 1.0 | 2.0 ... 10.0 | 7.0 ... 13.0 |
| B$_2$O$_3$ | 10.0 ... 20.0 | 20.0 ... 32.0 | 14.0 ... 26.0 |
| Al$_2$O$_3$ | 5.0 ... 10.0 | 1.0 ... 15.0 | 4.0 ... 16.0 |
| Bi$_2$O$_3$ | | 0 ... 10.0 | |
| La$_2$O$_3$ | | | |
| SiO$_2$ | 60.0 ... 70.0 | 24.0 ... 40.0 | 30.0 ... 50.0 |
| TiO$_2$ | 0 ... 2.0 | | 0 ... 4.0 |
| ZrO$_2$ | 0 ... 2.0 | | 0 ... 3.0 |
| SnO$_2$ | | | |
| P$_2$O$_5$ | | | |
| Sb$_2$O$_3$ | | | |
| F | | | 0 ... 3.0 |
| SO$_3$ | | | |
| Fe$_2$O$_3$ | | | |
| Y$_2$O$_3$ | | | |
| CeO$_2$ | | | |
| PbO | | | |
| Further Rare Earth Metal Oxides | | | |
| CdO | | | |
| T$_g$ (° C.) | | | |
| E$_w$ (° C.) | | | |
| V$_A$ (° C.) | | | |

| | Glass Composition 10 Gew.- % | Glass Composition 11 Gew.- % | Glass Composition 12 Gew.- % |
|---|---|---|---|
| Li$_2$O | | 2.5 ... 4 | 0.9 ... 7.4 |
| Na$_2$O | 3.0 ... 10.0 | 2.7 ... 7.4 | 1.6 ... 8.2 |
| K$_2$O | 0 ... 2.0 | 2.9 ... 8.0 | 0.5 ... 6.1 |
| MgO | | 0 ... 0.5 | 0 ... 4.0 |
| CaO | 2.0 ... 5.0 | 0 ... 0.5 | 0.4 ... 4.5 |
| SrO | | | 0 ... 4.0 |
| BaO | 0.5 ... 3.0 | 0 ... 0.5 | |
| ZnO | 6.0 ... 13.0 | 0 ... 1.5 | 0.4 ... 3.8 |
| B$_2$O$_3$ | 20.0 ... 40.0 | 14.5 ... 18.5 | 11.0 ... 36.4 |
| Al$_2$O$_3$ | | 3.0 ... 5.0 | 2.0 ... 14.6 |
| Bi$_2$O$_3$ | | | |
| La$_2$O$_3$ | | | 0 ... 3.0 |
| SiO$_2$ | 45.0 ... 70.0 | 53.0 ... 70.0 | 28.0 ... 69.0 |
| TiO$_2$ | 0 ... 20 | 0 ... 0.5 | 0 ... 6.0 |
| ZrO$_2$ | | 5.5 ... 13.5 | 1.3 ... 20.6 |
| SnO$_2$ | | | |
| P$_2$O$_5$ | | 0 ... 0.5 | 0 ... 10.0 |
| Sb$_2$O$_3$ | 0 ... 0.5 | | |
| F | 0 ... 4.0 | | 0 ... 8.0 |
| SO$_3$ | | 0 ... 0.5 | |
| Fe$_2$O$_3$ | | 0 ... 0.5 | |
| Y$_2$O$_3$ | | 0 ... 0.5 | 0 ... 1.0 |
| CeO$_2$ | | 0 ... 0.5 | |
| PbO | 0 ... 2.0 | | 0 ... 1.5 |
| Further Rare Earth Metal Oxides | | | 0 ... 1.0 |
| CdO | | | |
| T$_g$ (° C.) | | | 470 ... 610 |
| E$_w$ (° C.) | | | |
| V$_A$ (° C.) | | | |
| | | | α$_{20–300° C.}$ (10$^{-6}$ K) 5.0 ... 8.0. |

2. The ceramic toner in accordance with claim 1, wherein the ceramic toner has a thermoplastic matrix which melts homogeneously onto a substrate in a temperature range between 100° C. and 400° C., and in a second temperature range starting at 300° C. to 500° C. at least one of evaporates and is burned off with almost no residue.

3. The ceramic toner in accordance with claim 2, wherein the thermoplastic matrix has toner resins on an acrylate basis, including styrene acrylate and polymethylmethacrylate.

4. The ceramic toner in accordance with claim 3, wherein the thermoplastic matrix contains polymers, including at least one of polyvinyl alcohol, polyoximethylene, styrene copolymers, polyvinylidene fluoride, polyvinylbutyral, polyester including unsaturated and saturated and mixtures thereof, polycarbonate, polyvinyl pyrrolidone, vinyl imidazole copolymers and polyether.

5. The ceramic toner in accordance with claim 4, wherein as an additive the ceramic toner contains at least one of charge-control materials and oxidation agents, and auxiliary flow materials, including aerosils.

6. The ceramic toner in accordance with claim 5, wherein the ceramic toner is coated with the auxiliary flow materials.

7. The ceramic toner in accordance with claim 6, wherein the additives and the auxiliary materials are added in amounts respectively between 0 and 1.0 weight-%.

8. The ceramic toner in accordance with claim 7, wherein a particle size of the glass flux and the pigments lies in the range of 0.5 to 25 µm (D5O vol.).

9. The ceramic toner in accordance with claim 8, wherein toner particles have an irregular shape and are partially encased by the plastic matrix.

10. The ceramic toner in accordance with claim 9, wherein the ceramic toner contains at least one of peroxides and azo compounds for decomposition of polymers at a decomposition temperature >150° C.

11. The ceramic toner in accordance with claim 10, wherein the ceramic toner is applied to a transfer medium.

12. The ceramic toner in accordance with claim 11, wherein the transfer medium is a carrier, including one of a paper and a foil coated with gum arabic.

13. The ceramic toner in accordance with claim 1, wherein the plastic matrix has toner resins on an acrylate basis, including styrene acrylate and polymethylmethacrylate.

14. The ceramic toner in accordance with claim 1, wherein the plastic matrix contains polymers, including at least one of polyvinyl alcohol, polyoximethylene, styrene copolymers, polyvinylidene fluoride, polyvinylbutyral, polyester including unsaturated and saturated and mixtures thereof, polycarbonate, polyvinyl pyrrolidone, vinyl imidazole copolymers and polyether.

15. The ceramic toner in accordance with claim 1, wherein as an additive the ceramic toner contains at least one of charge-control materials and oxidation agents, and auxiliary flow materials, including aerosils.

16. The ceramic toner in accordance with claim 1, wherein the ceramic toner is coated with auxiliary flow materials.

17. The ceramic toner in accordance with claim 1, wherein additives and auxiliary materials are added in amounts respectively between 0 and 1.0 weight-%.

18. The ceramic toner in accordance with claim 6, wherein a particle size of the glass flux and the pigments lies in the range of 0.5 to 25 µm (D5O vol.).

19. The ceramic toner in accordance with claim 1, wherein toner particles have an irregular shape and are partially encased by the plastic matrix.

20. The ceramic toner in accordance with claim 1, wherein the ceramic toner contains at least one of peroxides and azo compounds for decomposition of polymers at a decomposition temperature >150° C.

21. The ceramic toner in accordance with claim 1, wherein the ceramic toner is applied to a transfer medium.

22. The ceramic toner in accordance with claim 21, wherein the transfer medium is a carrier, including one of a paper and a foil coated with gum arabic.

23. A ceramic toner which can be transferred by an electro-photographic printing to a glass, a glass-ceramic or a ceramic substrate having a high temperature resistance and which can be baked on during a subsequent temperature process, and which contains color pigment particles, in addition to glass flux particles, wherein the ceramic toner has:

45 to 60 weight-%, of a special glass frit, and 5 to >20 weight-% of inorganic pigments, >30 to 50 weight-% of a plastic matrix, the ceramic toner comprising:

a glass flux having a composition composed from a list of compositions 1–12, the compositions 1–12 being:

| | Glass Composition 1 Gew.-% | Glass Composition 2 Gew.-% | Glass Composition 3 Gew.-% | Glass Composition 4 Gew.-% | Glass Composition 5 Gew.-% | Glass Composition 6 Gew.-% | Glass Composition 7 Gew.-% | Glass Composition 8 Gew.-% | Glass Composition 9 Gew.-% | Glass Composition 10 Gew.-% | Glass Composition 11 Gew.-% | Glass Composition 12 Gew.-% |
|---|---|---|---|---|---|---|---|---|---|---|---|---|
| $Li_2O$ | 0 ... 6.0 | 0 ... 5.0 | 2.0 ... 4.0 | 0 ... 2.0 | 0 ... 3.0 | 0.1 ... 1.5 | 2.0 ... 5.0 | 0 ... 7.0 | 2.0 ... 5.0 | | 2.5 ... 4 | 0.9 ... 7.4 |
| $Na_2O$ | 0 ... 5.0 | 0 ... 5.0 | 5.0 ... 9.5 | 0 ... 5.0 | 0 ... 2.5 | 7.0 ... 13.0 | 1.0 ... 2.5 | 2.0 ... 8.0 | 5.0 ... 10.0 | 3.0 ... 10.0 | 2.7 ... 7.4 | 1.6 ... 8.2 |
| $K_2O$ | 0 ... 2.0 | 0 ... 2.5 | 1.5 ... 4.0 | 0 ... 5.0 | 0 ... 8.0 | 0 ... 1.5 | 1.0 ... 3.0 | 0 ... 5.0 | 0 ... 2.0 | | 2.9 ... 8.0 | 0.5 ... 6.1 |
| MgO | 0 ... 4.0 | 0 ... 3.0 | 0.0 ... 0.1 | 0 ... 0.5 | 0 ... 8.5 | | 0 ... 1.5 | | 1.0 ... 7.0 | 0 ... 2.0 | 0 ... 0.5 | 0 ... 4.0 |
| CaO | 0 ... 4.0 | 0 ... 4.0 | | 0 ... 1.0 | 0 ... 4.0 | | | 0 ... 3.0 | 0 ... 2.0 | 2.0 ... 5.0 | 0 ... 0.5 | 0.4 ... 4.5 |
| SrO | 0 ... 4.0 | 0 ... 4.0 | | | 0.5 ... 4.0 | | | 0 ... 3.0 | | | | 0 ... 4.0 |
| BaO | 0 ... 1.0 | 0 ... 4.0 | | | | | | | | | 0 ... 1.5 | |
| ZnO | 0 ... 4.0 | 0 ... 4.0 | | 0 ... 10.0 | 0 ... 28.0 | | 0 ... 4.0 | | 7.0 ... 13.0 | 0.5 ... 3.0 | | 0 ... 3.8 |
| $B_2O_3$ | 13.0 ... 23.0 | 15.0 ... 27.0 | 13.0 ... 20.0 | 1.0 ... 10.0 | 1.0 ... 15.0 | 2.0 ... 4.0 | 0 ... 1.0 | 2.0 ... 10.0 | 14.0 ... 26.0 | 6.0 ... 13.0 | 14.5 ... 18.5 | 11.0 ... 36.4 |
| $Al_2O_3$ | 3.0 ... 10.0 | 7.0 ... 20.0 | 5.0 ... 10.0 | 0.5 ... 10.0 | 4.0 ... 26.0 | 17.0 ... 22.0 | 10.0 ... 20.0 | 20.0 ... 32.0 | 4.0 ... 16.0 | 20.0 ... 40.0 | 3.0 ... 5.0 | 2.0 ... 14.6 |
| $Bi_2O_3$ | 0 ... 2.5 | 0 ... 2.5 | | | 2.5 ... 18.0 | 4.0 ... 8.0 | 5.0 ... 10.0 | 1.0 ... 15.0 | | | | |
| $La_2O_3$ | 0 ... 3 | 0 ... 0.9 | | | | | | 0 ... 10.0 | | | | |
| $SiO_2$ | 50.0 ... 65.0 | 43.0 ... 58.0 | 41.0 ... 59.0 | 20.0 ... 45.0 | 40.0 ... 62.0 | 55.0 ... 65.0 | 60.0 ... 70.0 | 24.0 ... 40.0 | 30.0 ... 50.0 | 45.0 ... 70.0 | 53.0 ... 70.0 | 28.0 ... 69.0 |
| $TiO_2$ | 0 ... 4.0 | 0 ... 3.0 | | 0 ... 0.5 | | 0 ... 2.0 | 0 ... 2.0 | | 0 ... 4.0 | 0 ... 20 | 0 ... 0.5 | 0 ... 6.0 |
| $ZrO_2$ | 0 ... 4.0 | 0 ... 4.0 | 2.0 ... 5.5 | 0 ... 1.0 | 0 ... 2.5 | | 0 ... 2.0 | | 0 ... 3.0 | | 5.5 ... 13.5 | 1.3 ... 20.6 |
| $SnO_2$ | 0 ... 2.0 | 0 ... 2.5 | | 0 ... 3.0 | | | | | | | | |
| $P_2O_5$ | 0 ... 1.5 | 0 ... 2.5 | | | | | | | | 0 ... 0.5 | | 0 ... 10.0 |
| $Sb_2O_3$ | 0 ... 2.0 | 0 ... 2.5 | | | | | | | 0 ... 3.0 | 0 ... 4.0 | | |
| F | 0 ... 4.0 | 0 ... 3.0 | 0 ... 4.0 | | | 0 ... 3.5 | | | | | | 0 ... 8.0 |
| $SO_3$ | | | | | | | | | | | 0 ... 0.5 | |
| $Fe_2O_3$ | | | | | | | | | | | 0 ... 0.5 | |
| $Y_2O_3$ | | | | | | | | | | | 0 ... 0.5 | 0 ... 1.0 |
| $CeO_2$ | | | | | | | | | | | 0 ... 0.5 | |
| PbO | | | | 0 ... 10.0 | | | | | | 0 ... 2.0 | | 0 ... 1.5 |
| Further Rare Earth Metal Oxides | | | | 20.0 ... 60.0 | | | | | | | | 0 ... 1.0 |
| CdO | | | | 0 ... 1.5 | | | | | | | | |
| $T_g$ (°C) | 400 ... 650 | 450 ... 650 | | | | | | | | | | 470 ... 610 |
| $E_w$ (°C) | 580 ... 830 | 600 ... 850 | | | | | | | | | | |
| $V_A$ (°C) | 840 ... 1100 | 880 ... 1150 | | | | | | | | | | |
| $\alpha_{20-700°\,C.}$ ($10^{-6}$ °K) | < 2.0 | 3.5–7.0 | | | | | | | | | | |
| $\alpha_{20-300°\,C.}$ ($10^{-6}$ °K) | 3.5–8.0 | | | | | | | | | | | 5.0 ... 8.0 |

24. The ceramic toner in accordance with claim 1, wherein additives and auxiliary materials are added in amounts respectively between 0.2 and 0.5 weight-%.

25. The ceramic toner in accordance with claim 6, wherein a particle size of the glass flux and the pigments lies in the range of between 1 and 10 μm.

* * * * *

UNITED STATES PATENT AND TRADEMARK OFFICE
CERTIFICATE OF CORRECTION

PATENT NO. : 7,018,760 B2
APPLICATION NO. : 10/498891
DATED : March 28, 2006
INVENTOR(S) : Bernd Schultheis et al.

It is certified that error appears in the above-identified patent and that said Letters Patent is hereby corrected as shown below:

Cover page, item 73, Assignee, delete "Schott Glas" and insert --SCHOTT AG-- in its place.

Signed and Sealed this

Second Day of January, 2007

JON W. DUDAS
*Director of the United States Patent and Trademark Office*